United States Patent
Depinet

(10) Patent No.: US 9,970,835 B2
(45) Date of Patent: May 15, 2018

(54) STRING POT SYSTEM FOR CRASH TEST DUMMY

(71) Applicant: Humanetics Innovative Solutions, Inc., Plymouth, MI (US)

(72) Inventor: Paul Depinet, Norwalk, OH (US)

(73) Assignee: HUMANETICS INNOVATIVE SOLUTIONS, INC., Farmington Hills, MI (US)

( * ) Notice: Subject to any disclaimer, the term of this patent is extended or adjusted under 35 U.S.C. 154(b) by 0 days. days.

(21) Appl. No.: 15/341,995

(22) Filed: Nov. 2, 2016

(65) Prior Publication Data

US 2017/0122824 A1    May 4, 2017

Related U.S. Application Data

(60) Provisional application No. 62/249,855, filed on Nov. 2, 2015.

(51) Int. Cl.
| | |
|---|---|
| G01B 7/16 | (2006.01) |
| G01L 5/10 | (2006.01) |
| G01L 5/00 | (2006.01) |
| G01D 5/14 | (2006.01) |

(52) U.S. Cl.
CPC .............. *G01L 5/10* (2013.01); *G01D 5/14* (2013.01); *G01L 5/0052* (2013.01)

(58) Field of Classification Search
CPC ............ G01L 5/10; G01L 5/0052; G01D 5/14
USPC ......................................................... 73/774
See application file for complete search history.

(56) References Cited

U.S. PATENT DOCUMENTS

| | | | |
|---|---|---|---|
| 4,047,715 A * | 9/1977 | Gjessing | A61B 5/224 482/64 |
| 4,261,113 A | 4/1981 | Alderson | |
| 4,349,339 A | 9/1982 | Daniel | |
| 4,409,835 A | 10/1983 | Daniel et al. | |
| 5,236,144 A | 8/1993 | Kautz | |
| 5,317,931 A | 6/1994 | Kalami | |
| 5,560,118 A | 10/1996 | Plummer | |
| 6,503,163 B1 * | 1/2003 | Van Sant | G02B 26/0816 348/E13.005 |
| 6,982,409 B2 | 1/2006 | Huang et al. | |
| 7,508,530 B1 | 3/2009 | Handman | |
| 7,644,504 B2 | 1/2010 | Verdiyan et al. | |
| 9,038,549 B1 * | 5/2015 | Zebarjad | A47B 9/02 108/147 |
| 9,335,225 B2 | 5/2016 | Xu et al. | |
| 2005/0066705 A1 | 3/2005 | Choi | |
| 2006/0278026 A1 * | 12/2006 | Friedman | G01M 17/007 73/865.6 |
| 2009/0199421 A1 * | 8/2009 | Eaton | G01B 5/008 33/503 |
| 2010/0093493 A1 * | 4/2010 | Eldridge | A63B 21/0058 482/4 |

(Continued)

*Primary Examiner* — Max Noori
(74) *Attorney, Agent, or Firm* — Howard & Howard Attorneys PLLC

(57) ABSTRACT

A string pot system for a crash test dummy includes a pulley adapted to be disposed inside a body of the crash test dummy and a string wound around the pulley. The string pot system also includes a motor and/or flywheel connected to the pulley and an active control system in communication with the motor and/or flywheel that maintains a constant tension on the string.

20 Claims, 3 Drawing Sheets

(56) References Cited

U.S. PATENT DOCUMENTS

| | | | |
|---|---|---|---|
| 2012/0074645 A1* | 3/2012 | Hodge | F41J 7/04 273/127 D |
| 2014/0190279 A1 | 7/2014 | Been et al. | |
| 2014/0294485 A1 | 10/2014 | McInnis et al. | |
| 2015/0086957 A1 | 3/2015 | Gibbs et al. | |
| 2016/0078783 A1 | 3/2016 | Sullenberger et al. | |

* cited by examiner

STRING POT SYSTEM FOR CRASH TEST DUMMY

CROSS-REFERENCE TO RELATED APPLICATION(S)

The present application claims the benefit of U.S. Provisional Patent Application Ser. No. 62/249,855, filed Nov. 2, 2015, the entire disclosure of which is hereby expressly incorporated by reference.

BACKGROUND OF THE INVENTION

1. Field of the Invention

The present invention relates generally to crash test dummies and, more particularly, to a string pot system for a crash test dummy.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle, authorities examine vehicles to submit type approval, and consumer organizations provide information on vehicle safety ratings to the public.

Collision testing often involves the use of anthropomorphic test devices, better known as "crash test dummies", to estimate a human's injury risk. The dummy must possess the general mechanical properties, dimensions, masses, joints, and joint stiffness of the humans of interest. In addition, they must possess sufficient mechanical impact response similitude and sensitivity to cause them to interact with the vehicle's interior in a human-like manner.

The crash test dummy typically includes a head assembly, spine assembly (including neck), rib cage assembly, abdomen, pelvis assembly, right and left arm assemblies, and right and left leg assemblies. Generally, the arm assembly has an upper arm assembly and a lower arm assembly. The upper arm assembly is typically connected to a shoulder assembly, which, in turn, is typically connected to the spine assembly.

Current string pots use a spring to maintain tension on a string which is wound up by a pulley inside the body of the crash test dummy. A potentiometer or encoder measures the position of the pulley. This can be calibrated to measure displacement. When used in the crash test dummy, the spring is unable to maintain tension on the string while accelerating the pulley during high string accelerations. When larger springs are used, they can accelerate at higher rates, but then apply an unacceptable load to the rib or other part which is being measured. As a result, there is a need in the art to provide a system that maintains spring tension with a motor and/or flywheel and an active control system that maintains a constant tension on the string even with high acceleration rates. Thus, there is a need in the art for a string pot system for a crash test dummy that meets at least one of these needs.

SUMMARY OF THE INVENTION

Accordingly, the present invention provides a spring pot system for a crash test dummy. The string pot system includes a pulley adapted to be disposed inside a body of the crash test dummy and a string wound around the pulley. The string pot system also includes a motor and/or flywheel connected to the pulley and an active control system in communication with the motor and/or flywheel that maintains a constant tension on the string.

In addition, the present invention provides a crash test dummy including a body and a string pot system coupled to the body. The string pot system includes a pulley disposed inside the body, a string wound around the pulley, and an active control system that maintains a constant tension on the string.

One advantage of the present invention is that a new string pot system is provided for a crash test dummy. Another advantage of the present invention is that the string pot system eliminates rate sensitive slack issues for the crash test dummy. Yet another advantage of the present invention is that the string pot system maintains spring tension with a motor and/or flywheel with an active control system that maintains a constant tension on the string even with high acceleration rates.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
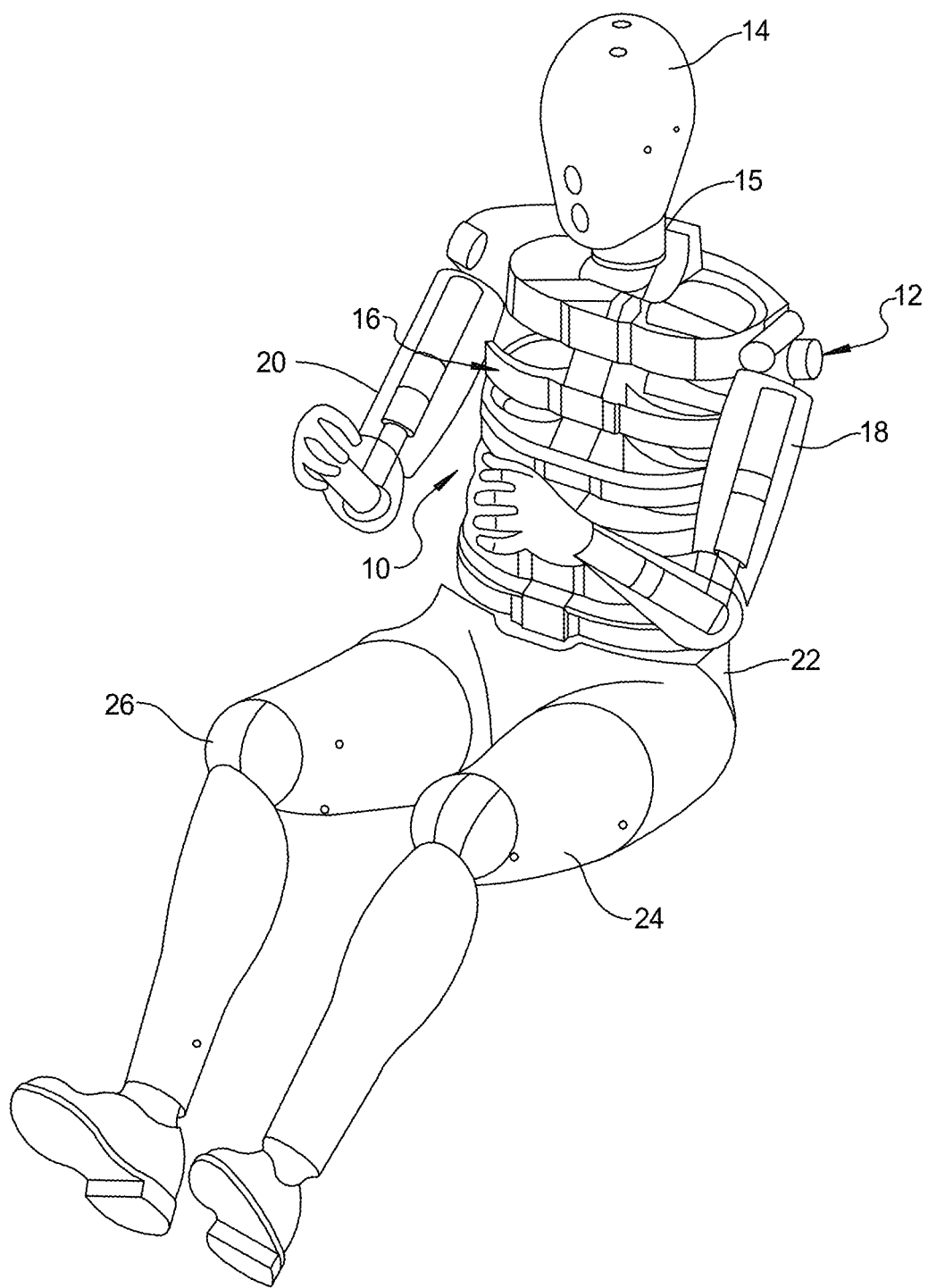
FIG. 1 is a perspective view of a crash test dummy, according to one embodiment of the present invention.
Figure 2:
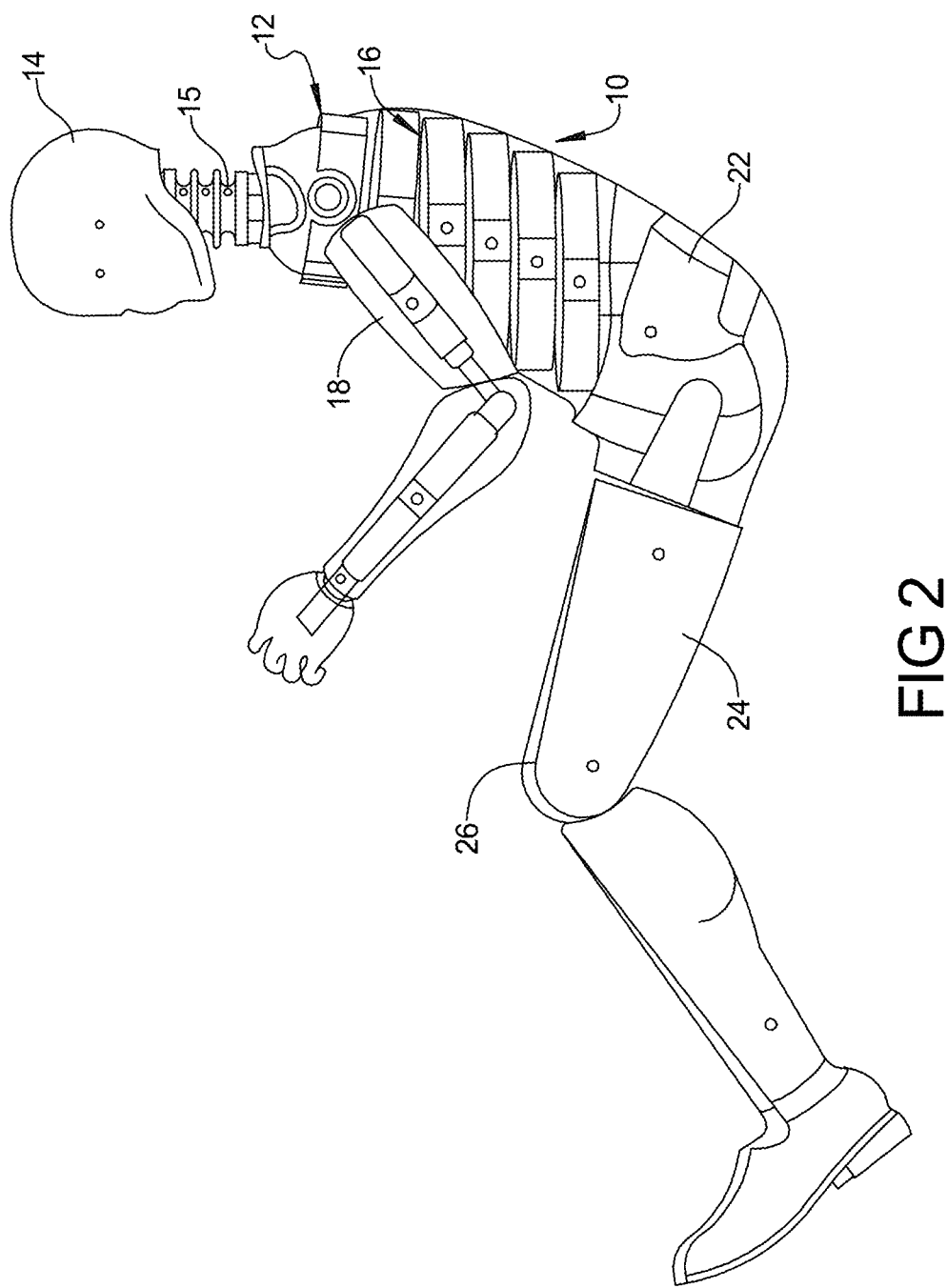
FIG. 2 is a side view of the crash test dummy of FIG. 1.

Referring to the drawings and in particular FIGS. 1 and 2, one embodiment of a crash test dummy, according to the present invention, is generally indicated at 12. The crash test dummy 12 is of a fiftieth percentile (50%) male type and is illustrated in a seated position. This crash test dummy 12 is used primarily to test the performance of automotive interiors and restraint systems for front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

As illustrated in FIG. 1, the crash test dummy 12 includes a head assembly, generally indicated at 14. The crash test dummy 12 also includes a spine assembly, generally indicated at 15, having an upper end mounted to the head assembly 14 and a lower end extending into a torso area of the crash test dummy 12. It should be appreciated that the spine assembly 15 includes a neck (not shown) attached to the head assembly 14.

The torso area of the crash test dummy 12 also includes a rib cage or torso assembly, generally indicated at 16, connected to the spine assembly 15. The crash test dummy 12 also has a pair of arm assemblies including a right arm assembly, generally indicated at 18, and a left arm assembly, generally indicated at 20, which are attached to the spine assembly 15 of the crash test dummy 12. It should be appreciated that a lower end of the spine assembly 15 is connected to a lumbar-thoracic adapter (not shown), which is connected to a lumbar to pelvic adapter (not shown).

As illustrated in the FIG. 1, the crash test dummy 12 includes a pelvis assembly, generally indicated at 22, connected to the adapter. The crash test dummy 12 includes a right leg assembly 24 and a left leg assembly 26, which are attached to the pelvis assembly 22. It should be appreciated that various components of the crash test dummy 12 may be covered in a polyvinyl skin such as a flesh and skin assembly, generally indicated at 28 and partially shown, for biofidelity of the crash test dummy 12.

Figure 3:
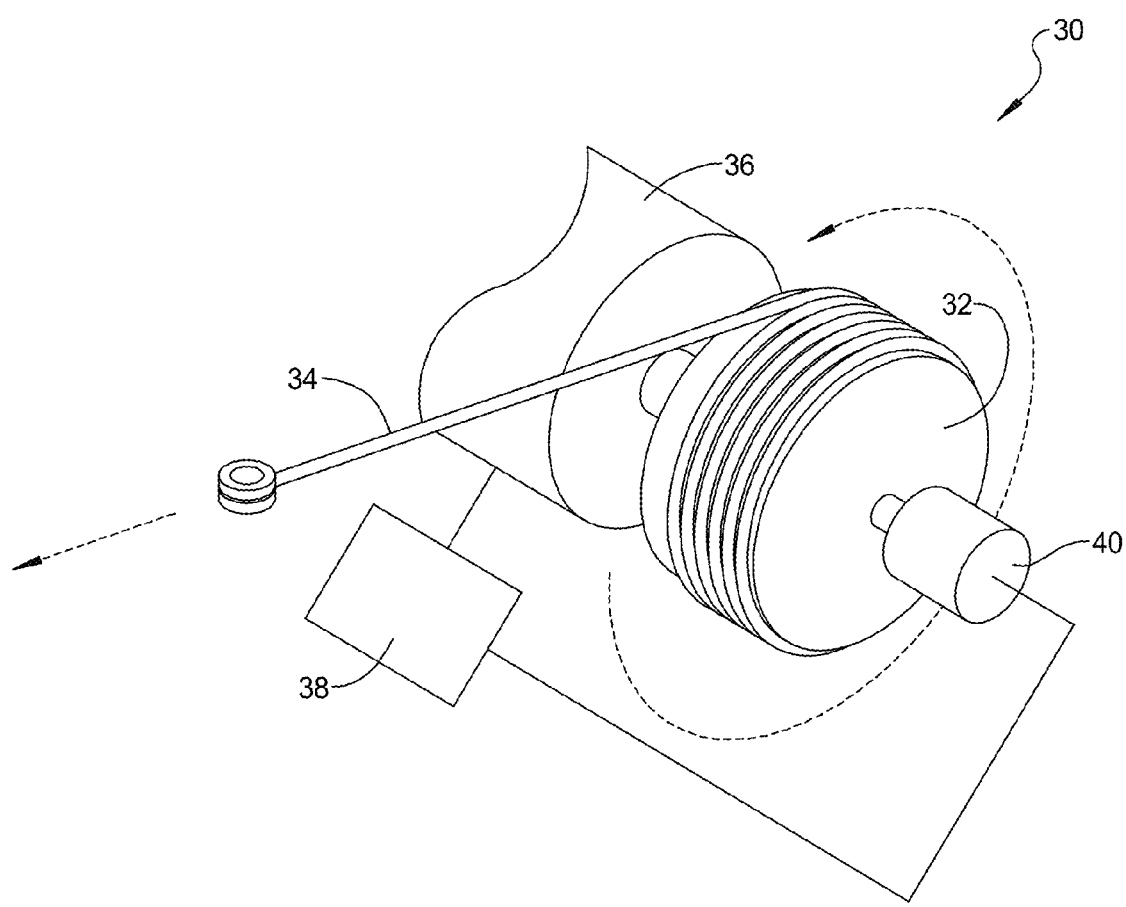
FIG. 3 is a perspective view of a string pot system, according to the present invention, for the crash test dummy of FIGS. 1 and 2.

Referring to FIG. 3, one embodiment of a string pot system 30, according to the present invention, is disclosed for the crash test dummy 12. The string pot system 30 includes a pulley or spool 32 and a string or wire 34 wound on the pulley 32. The string pot system 30 also includes a motor 36 attached to the pulley 32 and an active control system 38 in communication with the motor 36 to maintain a constant string tension on the string 34 using active feedback. The string pot system 30 may include a rotational sensor 40 such as a potentiometer or encoder connected to the pulley 32 and in communication with the active control system 38. The active control system 38 may be an electronic controller used to either monitor a combination of current, velocity, and/or angular acceleration of the motor 36, or may include a small load cell (not shown) in communication with the electronic controller to monitor torque, velocity and acceleration of the pulley 32. It should be appreciated that, from those parameters, the active control system 38 may estimate the required torque to apply to compensate for inertial resistance plus string tension to maintain a fairly constant string tension on the string 34. It should also be appreciated that, as long as string tension of the string 34 does not go above or below a threshold, it can fluctuate some and the string pot system 30 will still provide excellent readings. It should further be appreciated that, as the string 34 extends along with a moveable object such as a rib, it causes the pulley 32 and sensor 40 to rotate, creating an electrical signal proportional to the linear extension or velocity of the string 34.

In another embodiment, the string pot system 30 may include a flywheel (not shown) cooperating with the pulley 32. In one embodiment, the flywheel may be stacked on top of or inside the pulley 32. The motor 36 is used to accelerate and maintain velocity on the flywheel. In another embodiment, the flywheel could be magnetically coupled to the pulley 36. It should be appreciated that varying the magnetic coupling field would adjust the amount of slippage, and therefore torque, applied to the pulley 32. It should also be appreciated that the use of the flywheel may aid in applying a static load as well as providing a faster acceleration of the pulley 32 than is possible with only the motor 36.

Accordingly, the present invention is a string pot system 30 for a crash test dummy 12 that eliminates rate sensitive slack issues for a crash test dummy. The sting pot system 30 of the present invention maintains spring tension with a motor 36 and/or flywheel with an active control system 38 that maintains a constant tension on the string 34 even with high acceleration rates.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A string pot system for a crash test dummy comprising:
    a pulley adapted to be disposed inside a body of the crash test dummy;
    a string wound around said pulley;
    a motor connected to said pulley; and
    an active control system in communication with said motor to monitor at least one of velocity, torque, and acceleration of the pulley to maintain a constant tension on said string.

2. A string pot system as set forth in claim 1 including a rotational sensor operatively connected to said pulley and in communication with said active control system.

3. A string pot system as set forth in claim 2 wherein said rotational sensor comprises a potentiometer connected to said pulley.

4. A string pot system as set forth in claim 2 wherein said rotational sensor comprises an encoder connected to said pulley.

5. A string pot system as set forth in claim 1 including a flywheel cooperating with said pulley.

6. A string pot system as set forth in claim 5 wherein said flywheel is magnetically coupled to said pulley.

7. A string pot system as set forth in claim 5 wherein said motor is connected to said flywheel.

8. A string pot system for a crash test dummy comprising:
    a pulley adapted to be disposed inside a body of the crash test dummy;
    a string wound around said pulley; a motor connected to said pulley;
    an active control system in communication with said motor that maintains a constant tension on said string; and
    wherein said active control system comprises an electronic controller to allow torque, velocity and acceleration of said pulley to be monitored.

9. A string pot system as set forth in claim 8 wherein said active control system includes a load cell in communication with said electronic controller.

10. A crash test dummy comprising:
    a body; and
    a string pot system coupled to said body, said string pot system including a pulley disposed inside said body, a string wound around said pulley, and an active control system to monitor at least one of velocity, torque, and acceleration of the pulley to maintain a constant tension on said string.

11. A crash test dummy as set forth in claim 10 wherein said string pot system includes a motor connected to said pulley.

12. A crash test dummy as set forth in claim 11 wherein said active control system is in communication with said motor.

13. A crash test dummy as set forth in claim 10 wherein said active control system includes a rotational sensor operatively connected to said pulley and in communication with said active control system.

14. A crash test dummy as set forth in claim 13 wherein said rotational sensor comprises a potentiometer connected to said pulley.

15. A crash test dummy as set forth in claim 13 wherein said rotational sensor comprises an encoder connected to said pulley.

16. A crash test dummy as set forth in claim 10 wherein said string pot system includes a flywheel cooperating with said pulley.

17. A crash test dummy as set forth in claim 16 wherein said flywheel is magnetically coupled to said pulley.

18. A crash test dummy as set forth in claim 16 wherein said motor is connected to said flywheel.

19. A crash test dummy comprising:
- a body;
- a string pot system coupled to said body, said string pot system including a pulley disposed inside said body, a string wound around said pulley, and an active control system that maintains a constant tension on said string; and
- wherein said active control system comprises an electronic controller to allow torque, velocity and acceleration of said pulley to be monitored.

20. A crash test dummy as set forth in claim 19 wherein said active control system includes a load cell in communication with said electronic controller.

* * * * *